United States Patent
Buoni

(10) Patent No.: US 10,866,346 B2
(45) Date of Patent: Dec. 15, 2020

(54) BLACK MICROPRISMATIC RETROREFLECTIVE FILM

(71) Applicant: Aura Optical Systems, LP, Fort Worth, TX (US)

(72) Inventor: Drew J. Buoni, Fort Worth, TX (US)

(73) Assignee: Aura Optical Systems, LP, Fort Worth, TX (US)

( * ) Notice: Subject to any disclaimer, the term of this patent is extended or adjusted under 35 U.S.C. 154(b) by 375 days.

(21) Appl. No.: 15/741,842

(22) PCT Filed: Sep. 16, 2016

(86) PCT No.: PCT/US2016/052290
§ 371 (c)(1),
(2) Date: Jan. 4, 2018

(87) PCT Pub. No.: WO2017/049190
PCT Pub. Date: Mar. 23, 2017

(65) Prior Publication Data
US 2018/0188425 A1    Jul. 5, 2018

Related U.S. Application Data

(60) Provisional application No. 62/220,489, filed on Sep. 18, 2015.

(51) Int. Cl.
*G02B 5/124* (2006.01)
*G02B 5/04* (2006.01)
(Continued)

(52) U.S. Cl.
CPC .............. *G02B 5/124* (2013.01); *B32B 38/06* (2013.01); *B32B 38/14* (2013.01); *G02B 5/045* (2013.01);
(Continued)

(58) Field of Classification Search
CPC ........ G02B 5/04; G02B 5/045; G02B 17/086; G02B 17/08; G02B 6/00; G02B 26/0833;
(Continued)

(56) References Cited

U.S. PATENT DOCUMENTS 5,376,431 A    12/1994    Rowland
5,928,761 A    7/1999    Hedblom et al.
(Continued)

FOREIGN PATENT DOCUMENTS

WO    2017049190 A1    3/2017

OTHER PUBLICATIONS

PCT Notification of Transmittal of the International Search Report and the Written Opinion of the International Searching Authority; Application No. PCT/US2016/052290; dated Dec. 2, 2016; 14 pages.

*Primary Examiner* — Collin X Beatty
*Assistant Examiner* — Grant A Gagnon
(74) *Attorney, Agent, or Firm* — Parker Justiss, P.C.

(57) ABSTRACT

One embodiment of the present disclosure provides a black microprismatic retroreflective film. The black microprismatic retroreflective film comprises a body layer and a black color layer. The body layer includes microprismatic optical elements. The black color layer gives the black microprismatic retroreflective film a daytime color of black. The black microprismatic retroreflective film has a coefficient of retroreflectivity greater than 50 cd/lx/m2 at a −4 degree entrance angle and 0.2 degree observation angle.

26 Claims, 10 Drawing Sheets

(51) Int. Cl.
  *B32B 38/14* (2006.01)
  *B32B 38/06* (2006.01)
  *B29D 11/00* (2006.01)
(52) U.S. Cl.
  CPC ... *B29D 11/00605* (2013.01); *B32B 2307/416* (2013.01)
(58) Field of Classification Search
  CPC .... G02B 27/145; G02B 6/0053; G02B 17/04; G02B 17/0816; G02B 23/02; G02B 27/0101; G02B 27/0172; G02B 27/0994; G02B 27/126; G02B 5/008; G02B 6/0038; G02B 17/00; G02B 17/006; G02B 17/008; G02B 17/0832; G02B 17/0856; G02B 19/0028; G02B 1/02; G02B 1/11; G02B 2027/0118; G02B 2027/0156; G02B 23/14; G02B 25/001; G02B 27/01; G02B 27/0905; G02B 27/142; G02B 27/286; G02B 5/0284; G02B 5/06; G02B 5/08; G02B 5/124; G02B 5/1814; G02B 5/1828; G02B 6/0046; G02B 7/1805; G02B 13/007; G02B 13/10; G02B 13/22; G02B 17/023; G02B 17/045; G02B 17/0812; G02B 17/0848; G02B 19/0061; G02B 19/0085; G02B 19/0095; G02B 1/04; G02B 1/06; G02B 1/10; G02B 1/105; G02B 1/12; G02B 1/14; G02B 2027/013; G02B 21/0008; G02B 21/0012; G02B 21/16; G02B 21/22; G02B 21/32; G02B 23/04; G02B 23/08; G02B 23/10; G02B 23/105; G02B 23/12; G02B 23/16; G02B 23/243; G02B 23/2476; G02B 23/26; G02B 26/0816; G02B 26/0841; G02B 26/0883; G02B 26/0891; G02B 26/101; G02B 27/0006; G02B 27/0025; G02B 27/0031; G02B 27/017; G02B 27/0176; G02B 27/026; G02B 27/028; G02B 27/0927; G02B 27/0972; G02B 27/0977; G02B 27/10; G02B 27/1006; G02B 27/1033; G02B 27/1046; G02B 27/1066; G02B 27/108; G02B 27/14; G02B 27/141; G02B 27/143; G02B 27/149; G02B 27/2214; G02B 27/30; G02B 27/32; G02B 27/4244; G02B 3/08; G02B 5/02; G02B 5/021; G02B 5/0242; G02B 5/0252; G02B 5/0257; G02B 5/0808; G02B 5/09; G02B 5/12; G02B 5/1809; G02B 5/1842; G02B 5/1861; G02B 5/1876; G02B 5/204; G02B 5/208; G02B 5/3066; G02B 5/3083; G02B 6/0011; G02B 6/0025; G02B 6/0048; G02B 6/005; G02B 6/0055; G02B 6/0071; G02B 6/08; G02B 6/29358; G02B 6/29394; G02B 6/29395; G02B 6/4214; G02B 6/4246; G02B 7/021; G02B 7/04; G02B 7/18; G02B 7/181; G02B 7/182; G02B 7/24; B29D 11/00932; B32B 17/063; B32B 17/10; B32B 2038/0076; B32B 2255/102; B32B 2319/00; B32B 2323/04; B32B 2327/18; B32B 2369/00; B32B 25/04; B32B 25/08; B32B 25/20; B32B 27/308; B32B 27/322; B32B 27/365; B32B 7/12
  USPC ....................................................... 359/833
  See application file for complete search history.

(56) References Cited

U.S. PATENT DOCUMENTS

| | | |
|---|---|---|
| 2009/0021831 A1 | 1/2009 | Bacon, Jr. et al. |
| 2014/0285890 A1 | 9/2014 | Smith et al. |

BLACK MICROPRISMATIC RETROREFLECTIVE FILM

CROSS-REFERENCE TO RELATED APPLICATION

This application is the National Stage of, and therefore claims the benefit of, International Application No. PCT/US2016/052290 filed on Sep. 16, 2016, entitled "BLACK MICROPRISMATIC RETROREFLECTIVE FILM" which was published in English under International Publication Number WO 2017/049190 on Mar. 23, 2017. International Application No. PCT/US2016/052290 claims priority to U.S. Provisional Application No. 62/220,489 filed on Sep. 18, 2015 and, therefore, has a priority date of Sep. 18, 2015. Both of the above applications, PCT/2016/052290 and 62/220,489, are commonly assigned with this National Stage application and are incorporated herein by reference in their entirety.

TECHNICAL FIELD

This application is directed, in general, to microprismatic retroreflective films and, more specifically, to black microprismatic retroreflective films.

BACKGROUND

Retroreflective films have found extensive use in traffic signing, vehicle number plates, safety signing, vehicle markings, and many other applications. One common application is the use of retroreflective films on body panels of emergency or security vehicles, such as police cars, ambulances, or fire trucks. For these applications, the retroreflective films are used for warning markings, vehicle graphics, or vehicle striping. An important color for such applications is black, where the black retroreflective film appears black during the daytime, but it retroreflects white or light yellow colored light at night. In addition to being used for graphics, striping, or aesthetic purposes when applied to vehicle body panels on the front, sides, or rear of the emergency or security vehicles, black retroreflective films are also used for identification purposes when applied to the body panels of the hood or roof of a police car or security vehicle as such vehicles frequently need to be identified from the air by helicopters. For this purpose, it is especially important for the black reflective films to have exceptionally high levels of retroreflectivity at night in order to easily stand out from the surroundings. Especially in urban areas, there are many street lights, store front lights, and other lights which can make detection of such retroreflective identification markings more difficult.

SUMMARY

One embodiment of the present disclosure provides a black microprismatic retroreflective film. The black microprismatic retroreflective film comprises a body layer and a black color layer. The body layer contains microprismatic optical elements. The black color layer gives the black microprismatic retroreflective film a daytime color of black. The black microprismatic retroreflective film has a coefficient of retroreflectivity greater than 50 cd/lx/m2 at a −4 degree entrance angle and 0.2 degree observation angle.

Another embodiment of the present disclosure provides a traffic sign. The traffic sign includes a panel and a black microprismatic retroreflective film affixed to the panel. The black microprismatic retroreflective film comprises a body layer and a black color layer. The body layer contains microprismatic optical elements. The black color layer gives the black microprismatic retroreflective film a daytime color of black. The black microprismatic retroreflective film has a coefficient of retroreflectivity greater than 50 cd/lx/m2 at a −4 degree entrance angle and 0.2 degree observation angle.

Another embodiment of the present disclosure provides a vehicle. The vehicle includes body panels and a black microprismatic retroreflective film affixed to at least one of the body panels. The black microprismatic retroreflective film comprises a body layer and a black color layer. The body layer contains microprismatic optical elements. The black color layer gives the black microprismatic retroreflective film a daytime color of black. The black microprismatic retroreflective film has a coefficient of retroreflectivity greater than 50 cd/lx/m2 at a −4 degree entrance angle and 0.2 degree observation angle.

Another embodiment of the present disclosure provides a vehicle number plate. The vehicle number plate includes a mounting plate and black microprismatic retroreflective film affixed the mounting plate. The black microprismatic retroreflective film comprises a body layer and a black color layer. The body layer contains microprismatic optical elements. The black color layer gives the black microprismatic retroreflective film a daytime color of black. The black microprismatic retroreflective film has a coefficient of retroreflectivity greater than about 50 cd/lx/m2 at a −4 degree entrance angle and 0.2 degree observation angle.

BRIEF DESCRIPTION OF THE DRAWINGS

Reference is now made to the following descriptions taken in conjunction with the accompanying drawings, in which.

DETAILED DESCRIPTION

Creating a black retroreflective film with high levels of reflectivity can prove to be exceedingly difficult. Black pigments and colorants will absorb light, which in turn interferes with the retroreflective properties of a retroreflective film. The brightest retroreflective films typically do not contain any pigments or colorants which can absorb light impinging on the surface and entering into the film.

Some manufacturers have attempted to solve this problem by diluting the black color (and therefore the amount of black pigmentation) to create a slightly brown or gray daytime appearance, which (of course) detracts from the daytime color and performance of the film. Another problem with such approaches is that the resulting color of the retroreflected nighttime light often appears yellow or brown. A bright white or blue-white reflected color at night is typically preferred.

Existing black retroreflective film products currently available on the market all have relatively low levels of retroreflection. When tested at a −4 degree entrance angle and 0.2 degree observation angle, existing products have coefficient of retroreflective levels far below 50 cd/lx/m2. For example, the product data bulletin for SCOTCHLITE™ Series 680 Reflective Graphic Film (available from 3M Company of St. Paul, Minn.) reports that the typical coefficient of retroreflection is only cd/lx/m2 for the black color. Similarly, the product data bulletin for Avery Dennison Series HV-1200 Reflective Film (available from Avery Dennison Corporation of Pasadena, Calif.) reports that the typical coefficient of retroreflection is only 16 cd/lx/m2 for the black color. All of these products incorporate glass microspheres as the retroreflective optical elements within each material.

Therefore, it is an object of this disclosure to provide for a retroreflective film with a black daytime color and high levels of retroreflection at night. Further, it is also an object of this disclosure to provide for a black retroreflective film, which reflects a vibrant white or blue-white color at night.

In contrast to the existing products above, this disclosure provides for a black retroreflective sheeting incorporating cube corner microprisms as the retroreflective optical elements. As known in the art, such retroreflective films are known as microprismatic retroreflective films. In one embodiment, a black microprismatic retroreflective film has a coefficient of retroreflection greater than 50 cd/lx/m2 when tested at a −4 angle entrance angle and 0.2 degree observation angle. In other embodiments, the coefficient of retroreflection is greater than 70 cd/lx/m2. In still other embodiments, the coefficient of retroreflection is greater than 100 cd/lx/m2. In still further embodiments, the coefficient of retroreflection is greater than 150 cd/lx/m2 when tested at a −4 angle entrance angle and 0.2 degree observation angle.

Figure 8:
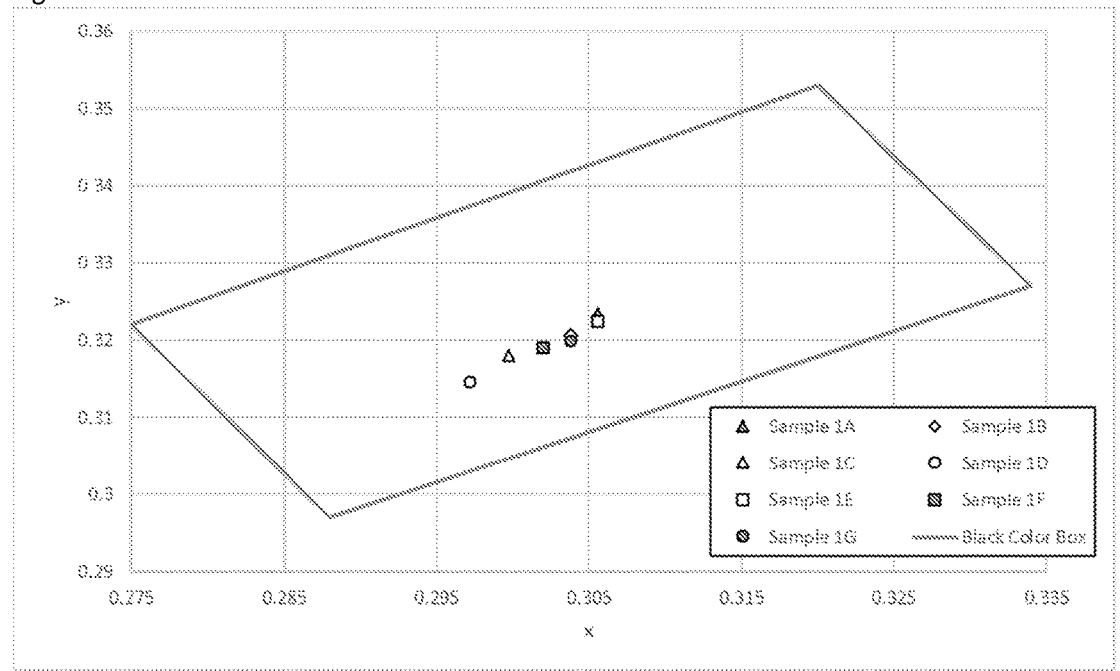
FIG. 8 illustrates black daytime chromaticity coordinates for samples of Example 1.
Figure 9:
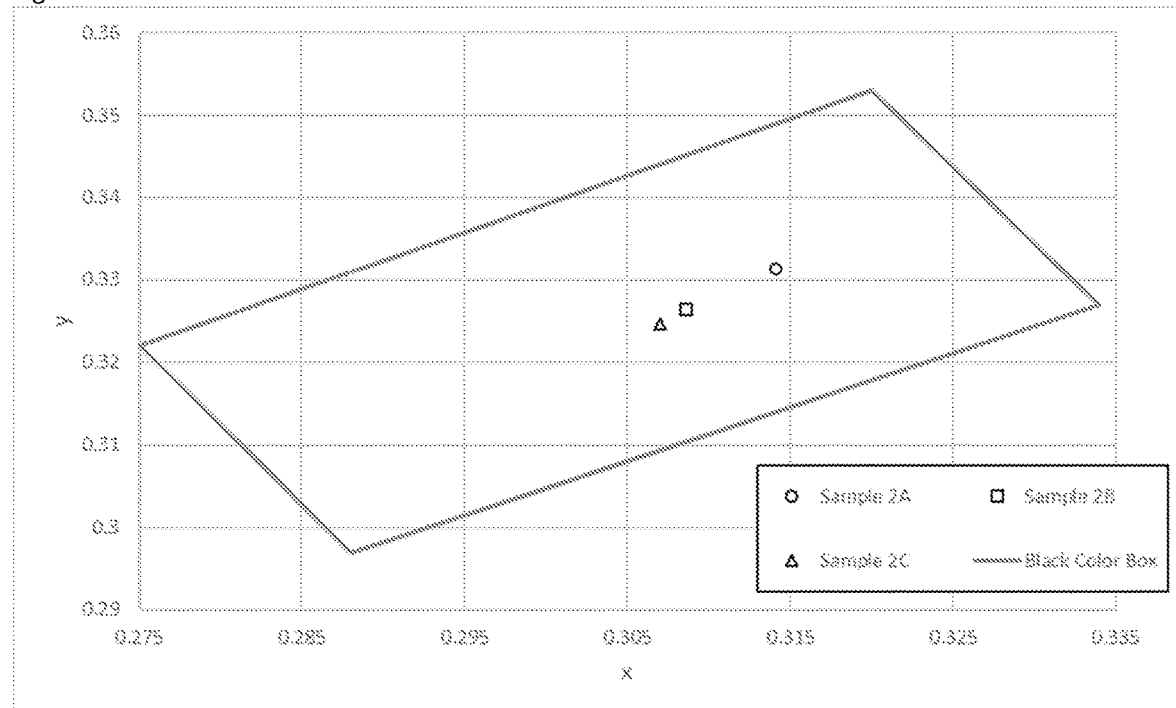
FIG. 9 illustrates black daytime color chromaticity coordinates for samples of Example 2.
Figure 10:
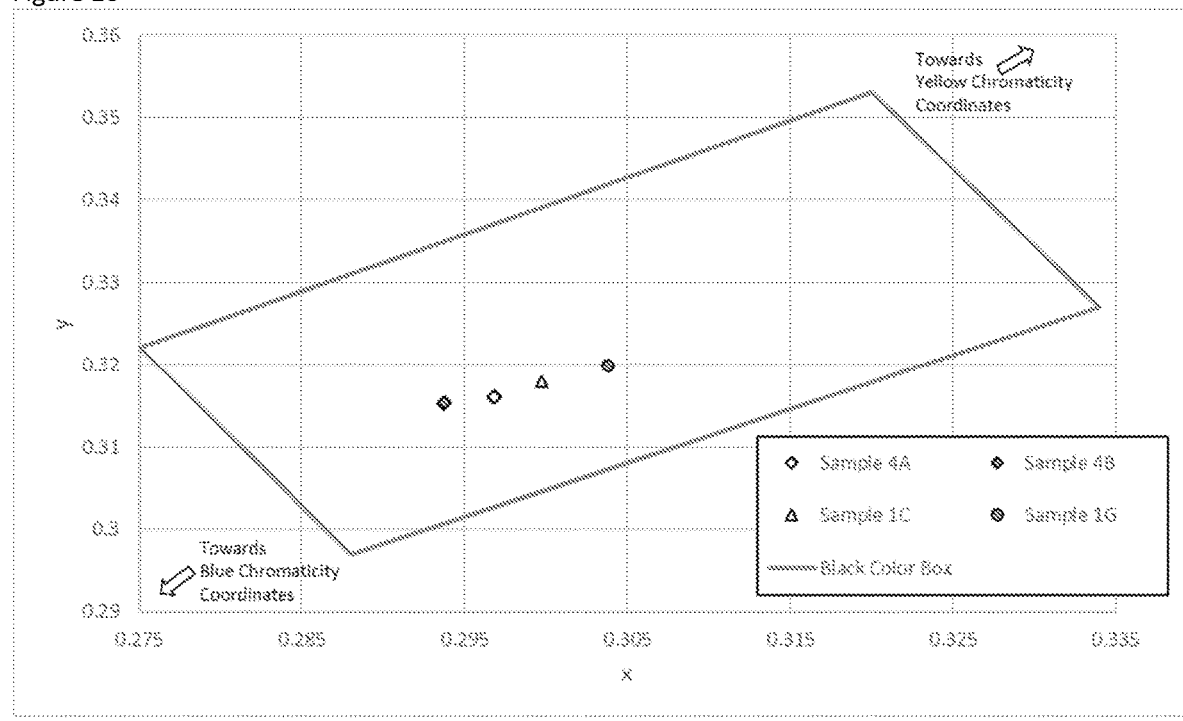
FIG. 10 illustrates a comparison of black daytime color chromaticity coordinates for samples of Examples 1 and 4.

Additionally, this disclosure allows for a black retroreflective film to have a deep black daytime color while still maintaining high levels of retroreflection. Daytime color can be measured using a HunterLab ColorFlex 0/45 colorimeter using Standard Illuminant D65 at a 2 degree observer and can be defined by using the x, y chromaticity coordinates and daytime luminance factor Y % (as defined by the CIE 1931 Standard Colorimetric System). Generally speaking, for a given chromaticity, a deeper and darker color is indicated by a smaller value for daytime luminance factor Y %. On the other hand, lighter colors have a higher daytime luminance factor Y %. In certain embodiments, the x, y chromaticity coordinates of the daytime color will fall within a color box defined by four sets of x, y coordinates (x1=0.288, y1=0.297); (x2=0.334, y2=0.327); (x3=0.320, y3=0.353); and (x4=0.275, y4=0.322) and the daytime luminance factor Y % will be less than 3.50. A plot of the black daytime color box formed by these four sets of chromaticity coordinates is shown in FIGS. 8-10. In other embodiments, the daytime luminance factor Y % will be less than 2.00. And, in still other embodiments, the daytime luminance factor Y % will be less than 1.50.

Figure 11:
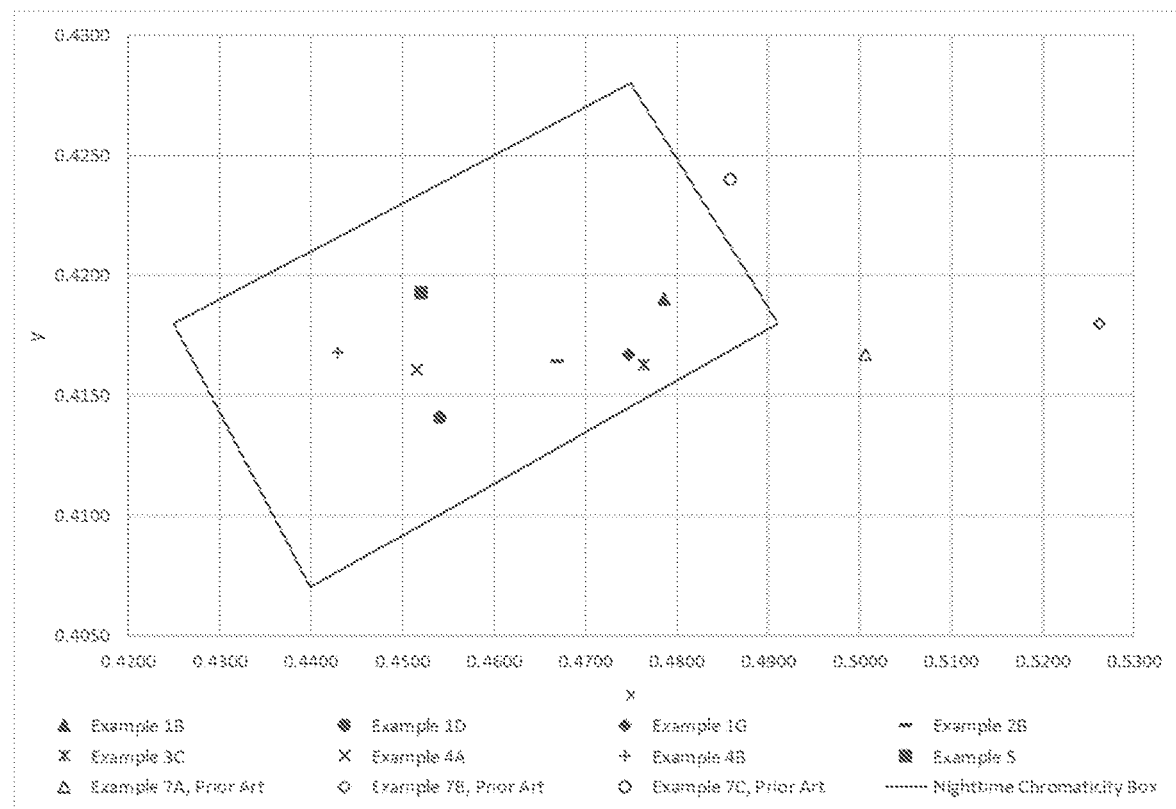
FIG. 11 illustrates comparison of black nighttime color chromaticity coordinates for samples of Examples 1-5 and 7.

Further, this disclosure also allows for a black retroreflective film to retroreflect a white or blue-white light at night. This nighttime color can be measured using the test method outlined in ASTM Practice E811 using standard illuminant A with an observation angle of 0.33 degrees and an entrance angle of 5 degrees to define x, y color chromaticity coordinates (as defined by the CIE 1931 Standard Calorimetric System) of the nighttime color. For each test sample, nighttime color measurements can be taken at 0 degree and 90 degree rotations for each sample, and the average of these rotations can be reported. In certain embodiments, the x, y chromaticity coordinates of the nighttime color will fall within a color box defined by four sets of x, y coordinates (x1=0.425, y1=0.418); (x2=0.475, y2=0.428); (x3=0.491, y3=0.418); and (x4=0.440, y4=0.407). A plot of the black nighttime color chromaticity box formed by these four sets of chromaticity coordinates is shown in FIG. 11.

Because this disclosure provides for such high levels of retroreflection relative to existing solutions, other applications can also be utilized beyond the aforementioned uses of vehicle markings or vehicle graphics on body panels thereof. It should be noted that for the purposes of this disclosure, the term body panel includes any exterior surface of a vehicle, including its doors, trunk, hood, fenders, roof, and other similar surfaces. The black microprismatic retroreflective films of this disclosure can also be utilized in vehicle number plates. This allows for the possibility of a vehicle number plate which, during the daytime, has a black background with white alphanumeric characters. However, when viewed retroreflectively at night, the background will appear white and the alphanumeric characters will appear black. Such a vehicle number plate can be created when the alphanumeric characters are created using an opaque white ink (or other opaque materials such as computer cut vinyl or prints made from thermal transfer foils or hot-stamping foils) and placed directly over top or in front of a black microprismatic retroreflective film being used as the background material. Because the opaque white alphanumeric characters will not retroreflect light at night, they appear black relative to the surrounding areas that appear white due to the white light retroreflected by the black microprismatic film. It should be noted that for the purposes of this disclosure, the term vehicle number plate includes a mounting plate to which the black microprismatic retroreflective film is affixed. The term mounting plate is defined to include, among other types of plates, both clear plastic face plates and metal backing plates. With clear plastic face plates, the black microprismatic retroreflective film would be affixed to a reverse side of the plate and an upper surface of the black microprismatic retroreflective film would be visible through the clear plastic face plate. With metal backing plates, the black microprismatic retroreflective film would be affixed to a top side of the metal backing plate. Similarly, this disclosure also contemplates that black microprismatic retroreflective films can be utilized in traffic signing applications, warning signs, vehicle identification decals, and many other applications. For traffic signing applications, the black microprismatic retroreflective film is typically affixed to a sign panel and words, symbols, or number are printed on or otherwise applied to the face of the black microprismatic retroreflective film.

Figure 1:
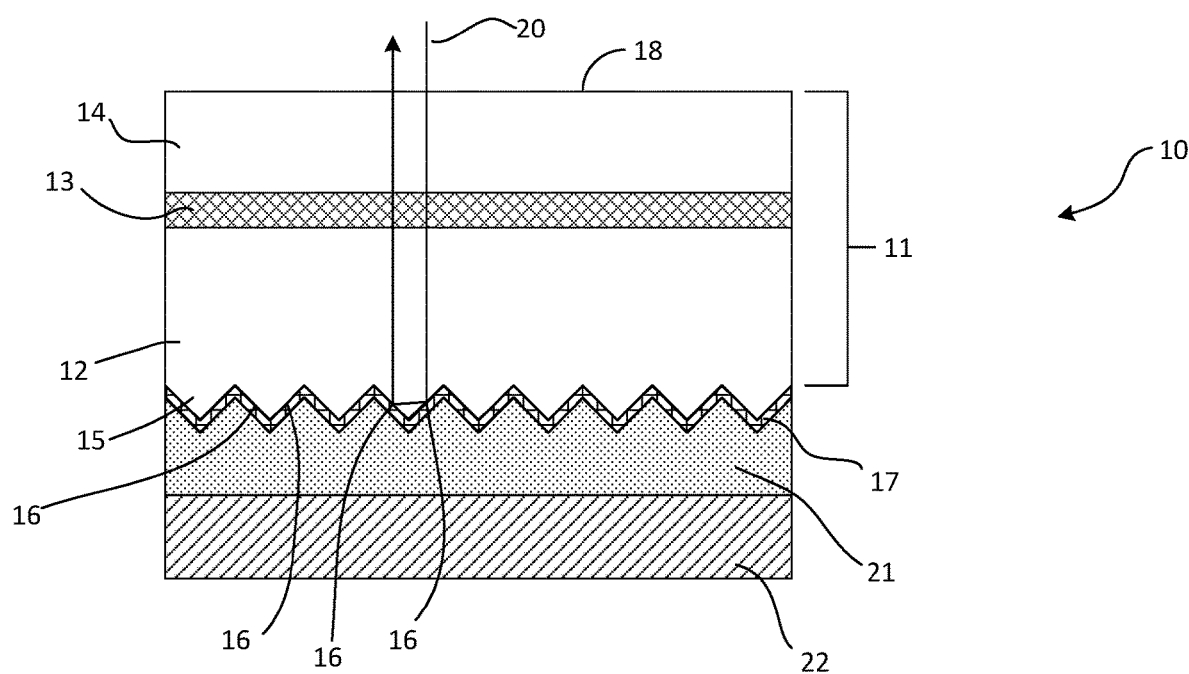
FIG. 1 shows a cross-sectional view of one embodiment of a black microprismatic retroreflective film.

FIG. 1 shows one embodiment of this disclosure. Black retroreflective film 10 includes reflective face film 11.

Reflective face film 11 consists of body layer 12, black color layer 13, and optional cap layer 14. Microprismatic optical elements 15 are located on the underside of body layer 12. (Microprismatic optical elements are also commonly known as microprisms, and for the purposes of this disclosure, the terms can be used interchangeably and have an identical meaning.) Light impinging on face 18 of black retroreflective film 10 will pass through the reflective face film 11 to be reflected by faces 16 of microprismatic optical elements 15 and be returned towards its source. This is depicted by arrow 20.

Figure 2:
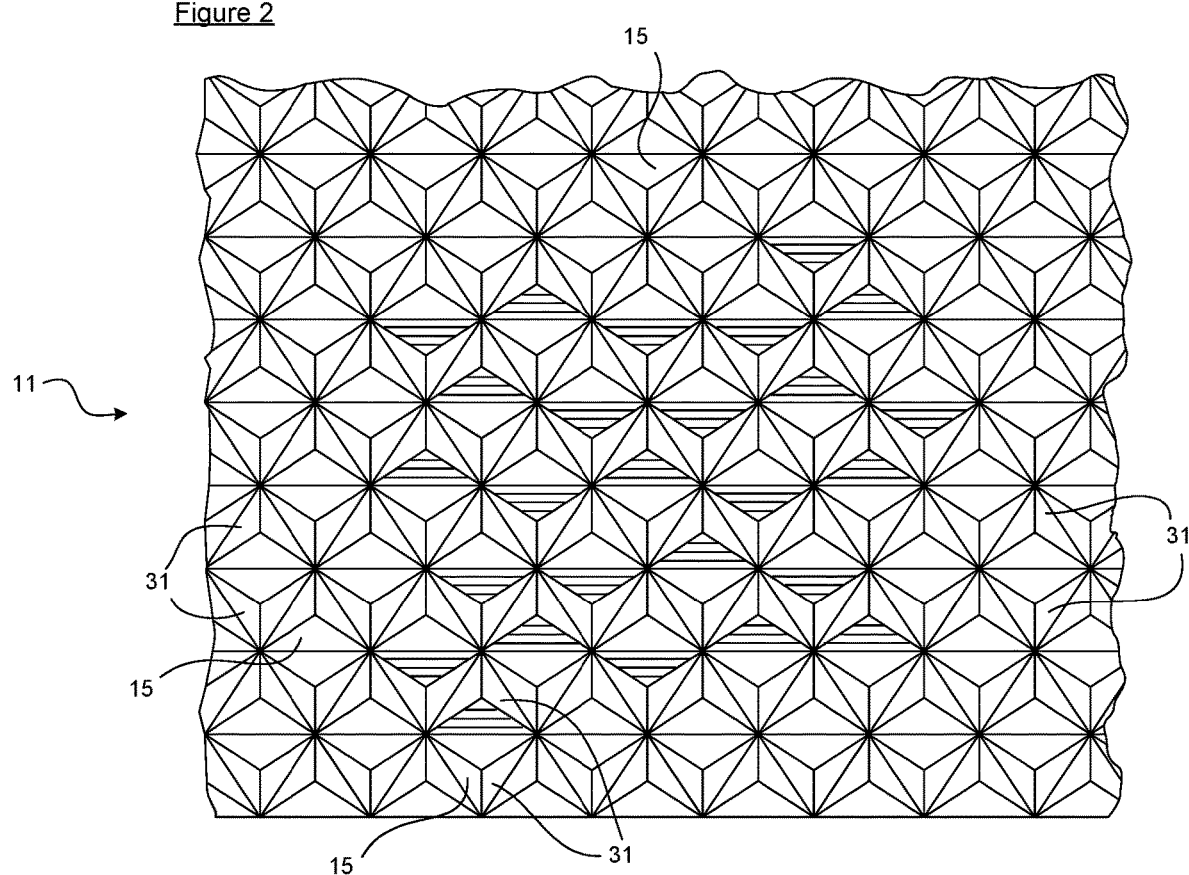
FIG. 2 illustrates a plan view of an arrangement of matched pairs of microprisms aligned in a single rotation.

Although FIG. 1 depicts the microprismatic optical elements in two-dimensions, as known in the art, microprismatic optical elements generally contain the shape of a corner cube and include three substantially mutually perpendicular faces to reflect incoming light. The microprisms 15 of this disclosure can be any of the well-known microprismatic optical elements, including equilateral microprisms, forward-tilted microprisms, backwards-tilted microprisms, or scalene microprisms. A detailed description of each of these categories of microprisms is outlined in US Patent Application Publication No. 2015/0362640 A1 by Buoni which is herein incorporated by reference in its entirety. Further, as known in the art, the microprisms 15 can either be a tetrahedron shaped microprism or a truncated full-cube microprism. Typically, as known in the art, the microprisms will be present in matched pairs. The presence of the matched pairs of microprisms is a by-product of the machining process utilized to manufacture the microprisms, which creates pair of adjacent microprisms which are aligned at 180 degree rotations relative to each other. FIG. 2 shows one embodiment of the disclosure where reflective face film 11 is depicted in a plan view and with the microprisms 15 forward-tilted microprisms having a tetrahedron shape and aligned as matched-pairs 31 throughout the film. The size of the microprisms, as measured from the apex to the base of each microprism, is less than 350 microns. In other embodiments, it is less than 200 microns. In still other embodiments, the height is less than 100 microns. In still other embodiments, the height is less than 75 microns.

Figure 3:
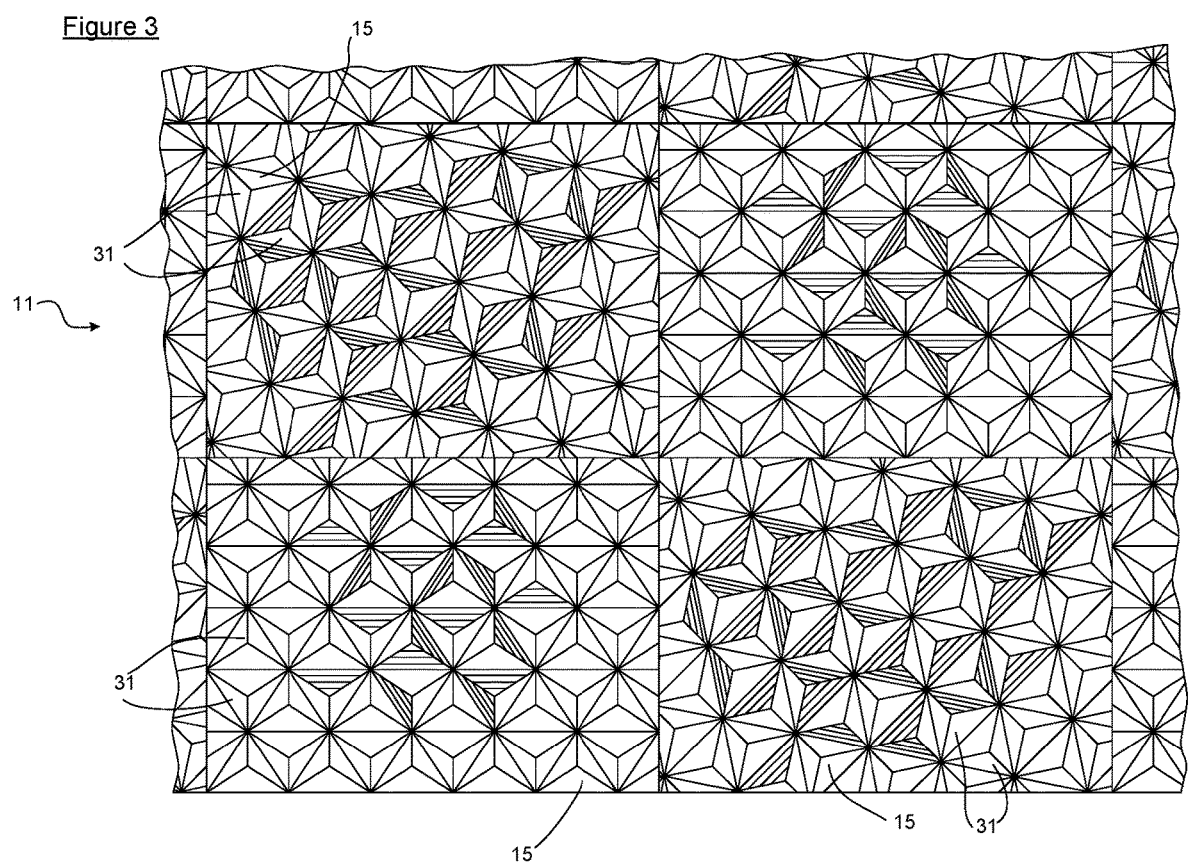
FIG. 3 illustrates a plan view of two discrete arrays of microprisms tiled at 45 degree rotations relative to each other.

As shown in FIG. 2, this disclosure contemplates that all of the microprisms 15 can be aligned in substantially the same direction throughout the black microprismatic retroreflective film. Alternatively, in other embodiments, the microprisms 15 can be aligned in arrays of discrete sets of microprisms with the arrays of microprisms rotated in two or more directions relative to each other. As known in the art, this alignment of arrays of microprisms is known as tiling. And, each individual array is known as a tile. Generally speaking, there are two benefits to tiling. First, since most microprisms are rotationally sensitive, tiling the microprisms in different directions can allow for more uniform levels of reflectivity as the retroreflective film is rotated around 360 degrees. Second, a tiling pattern often provides for a more aesthetically pleasing appearance to the retroreflective film. FIG. 3 shows a plan view of reflective face film 11 of one embodiment of the black microprismatic retroreflective sheeting where the microprisms 15 are arranged in two discrete arrays of microprisms rotated at 45 degrees relative to each other. And, within each array, the microprisms are arranged as matched pairs 31.

Individual tiles can consist of any desirable geometric shape such as rectangles, squares, stripes or strips, triangles, parallelograms, trapezoids, circles or other shapes such as stars, moons, or other patterns or designs. Additionally, it is not necessary for all tiles within a retroreflective film to be of the same shape or size. In one embodiment of this disclosure, the microprisms are tiled into discrete sets of microprisms with the area of the individual tiles being less than 2,000 square-millimeters. In other embodiments, the area of individual tiles is less than 1,000 square-millimeters. In still other embodiments, the area of the individual tiles is less than 500 square-millimeters.

The black color layer 13 of FIG. 1 contains the black pigments or colorants to impart the black color to the retroreflective film. Relative to the other layers of the construction, the black color layer is relatively thin. In certain embodiments, the black color layer is less than 50 microns in thickness. In other embodiments, the thickness is less than 25 microns. In still other embodiments, it is less than 15 microns. Without being bound by any particular theory, it is believed a thin black color layer will assist in minimizing light absorption as the light entering the reflective sheeting passes through the reflective face film to be reflected back towards its source by the microprismatic optical elements.

The black color layer 13 can be formed through any suitable manufacturing process, including printing, coating, casting, extrusion, or other similar processes. In certain embodiments, it is advantageous to form the black color layer 13 through either a coating or printing process. Such processes have the benefit of being able to create a very thin and uniform layer without significant thickness variations. Any significant thickness variations within the black color layer may lead to a streaky or blotchy appearance that detracts from the aesthetics of the product. Suitable coating or printing processes include gravure coating, flexographic printing, roll coating, knife coating, screen printing, ink jet printing, thermal transfer printing, hot stamping, or similar processes. Additionally, as known in the art, for many of the aforementioned processes, the ink or coating may be solvent-based, water-based, or a UV-light curable ink or coating.

The black color layer consists of a transparent resin component and a black colorant component. The black colorant is either a pigment or dye. If a black pigment is utilized, the particle size of the pigment should be minimized as the pigment is dispersed into the transparent resin. One particularly suitable black pigment is carbon black (also known as Pigment Black 7) as it is quite weatherable and colorfast and can readily be dispersed into a variety of polymeric resins.

The pigment particle size can be measured by a light scattering method using a Microtrac 53000 Particle Analyzer available from Microtrac of Montgomeryville, Pa. This instrumentation will provide data and information pertaining to the particle size distribution of the pigment particles within the overall volume of a sample. In some instances, this test method may require the transparent resin containing the black colorant to first be dispersed into a suitable solvent prior to analysis. In certain embodiments, the maximum particle size of the black pigments will be less than about 1 micron. In other embodiments, the maximum particle size will be less than about 0.6 microns. And, in still other embodiments, the maximum particle size will be less than about 0.35 microns. Further, in certain embodiments, the median particle size will be less than about 0.3 microns. In other embodiments, the median particle size will be less than about 0.15 microns. And, in still other embodiments, the median particle size will be less than about 0.10 microns.

Figure 4:
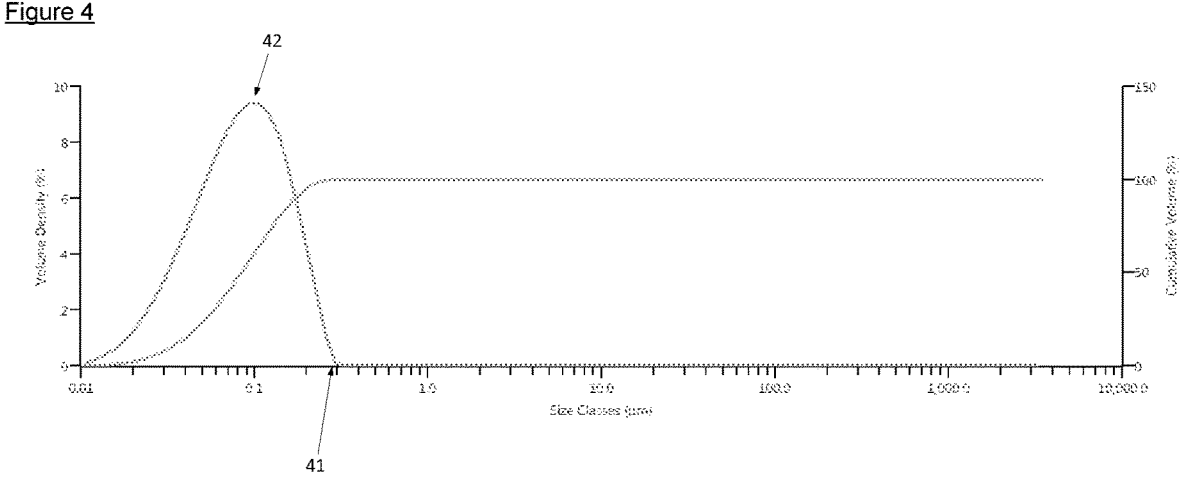
FIG. 4 illustrates a pigment particle size distribution of an embodiment of a black microprismatic retroreflective film.

FIG. 4 shows a graph charting the particle size distribution of one embodiment of this disclosure as measured by the Microtrac S3000 instrument. The graph charts the particle size (in microns) relative to the overall volume percentage of pigments within the sample. As shown in the graph, the maximum particle size (as indicated by arrow 41 is about 0.28 microns, and the median particle size (as indicated by arrow 42) is about 0.084 microns.

In addition to pigment particle size, a level of colorant loading in the black color layer is also important. If the colorant loading level is too high, it is possible that the black color layer may not allow any light to pass through to be retroreflected by the microprismatic optical elements. Instead, all of the incoming light may be absorbed by the black color layer and the resulting film will only appear black during the daytime, but will not retroreflect any light at night. Similarly, if the black colorant loading is too low, although light will readily pass through the black color layer to the microprismatic optical elements, the daytime color will not be the desired deep black color. Instead, the resulting film may have a gray daytime color. In such instances, the daytime color luminance factor Y % would be substantially higher than 3.50. In certain embodiments, in terms of weight percentage or the weight of the pigment in relation to the total weight of the black color layer, the loading of colorant or pigment in the black color layer would be between about 0.05% to about 5.0%. In other embodiments, the loading of colorant or pigment in the black color layer would be between about 0.15% to about 3.5%. It should be noted that, to some degree, the overall loading of colorant in the black color layer is dependent upon the thickness of the black color layer. A thinner black color layer may require higher levels of colorant loading. Conversely, a thicker black color layer may require lower levels of colorant loading.

In certain embodiments, in addition to the black colorants, the black color layer 13 also incorporates small amounts of transparent blue pigments or dyes. The presence of these blue colorants helps to darken the color without absorbing as much light as black colorants. Further, the presence of the blue colorants helps to off-set any potential for a yellow colored tint to the retroreflected light and helps to ensure a white or blue-white colored retroreflected light at night. Phthalocyanine blue (such as Pigment Blue 15:3 or Pigment Blue 15:2) is one suitable blue pigment as it is quite colorfast, durable, and easy to disperse into various polymeric resins to allow high levels of transparency. As with the black pigments, the particle size of any blue pigments used within the black color layer 13 should also be minimized. In certain embodiments, the amount of blue pigmentation relative to the amount of black pigmentation is less than 15%. In other embodiments, the amount of blue pigmentation relative to the amount of black pigmentation is less than 10%. In still other embodiments, the amount of blue pigmentation relative to the amount of black pigmentation is less than 5%.

The transparent resin of black color layer 13 can be any highly transparent polymeric resin (or combination of resins) and can be selected based upon the final performance requirements of the black retroreflective film or upon the compatibility of the transparent resin with the materials of the body layer. Suitable resins include acrylic polymers (including such acrylics as polymethyl methacrylate or polybutyl methacrylate), vinyl chloride polymers and vinyl co-polymers (such as a vinyl chloride/vinyl acetate co-polymer), ethylene vinyl acetate, polycarbonate, polyester, polystyrene, glycol modified polyester resins, polyurethane, and many other transparent polymers. Particularly useful polymers of the transparent resin layer are acrylic polymers and vinyl copolymers.

The body layer 12 of the black retroreflective film consists of one of more layers of transparent polymeric resin. In some instances, it is preferred to have the microprisms 15 formed from a first layer of transparent polymeric resin, and the remaining portion of the body layer 12 formed from one or more additional layers of polymeric resin. Further, it is not necessary to have the same transparent polymeric resin utilized throughout body layer 12. The overall thickness of the body layer 12 will range from about 75 microns to 400 microns. In other embodiments, the overall thickness of the body layer 12 will range from about 100 microns to 300 microns.

Figure 5:
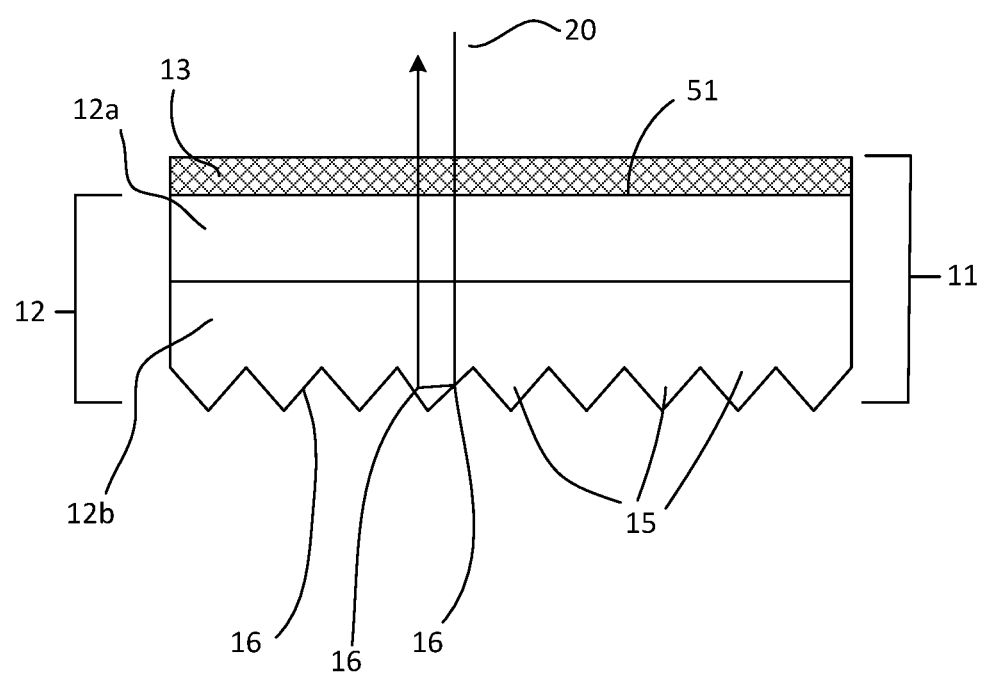
FIG. 5 shows a cross-sectional view of one embodiment of a black microprismatic retroreflective film with two body sub-layers.

FIG. 5 shows an embodiment of this disclosure displaying only reflective face film 11 where body layer 12 is split into two separate sub-layers. Upper body sub-layer 12a and lower body sub-layer 12b combine to form the overall body layer 12, and microprisms 15 are formed into the underside of lower body sub-layer 12b. In this embodiment of FIG. 5, black color layer 13 is positioned adjacent to the upper surface 51 of body layer 12a, and optional cap layer 14 is not shown. Separating the body layer 12 into two or more sub-layers may be useful if different transparent polymeric resins are desired to be used in the final product construction. For example, as known in the art, it may be beneficial to form the microprisms from a polycarbonate polymer since the polycarbonate refractive index of 1.59 is relatively high compared to other transparent polymeric resins. This is particularly beneficial for certain final product constructions, which will be described in more detail below, where the microprisms operate through the principles of total internal reflection. However, for cost reasons or other reasons, it may not be desirable to have the overall body layer 12 made from polycarbonate resin. Thus, the lower body sub-layer 12b could consist of a polycarbonate polymer, and upper-body sub-layer 12a could consist of a different polymeric resin, such as acrylic, vinyl or urethane polymer resins or other polymeric resins.

Figure 6:
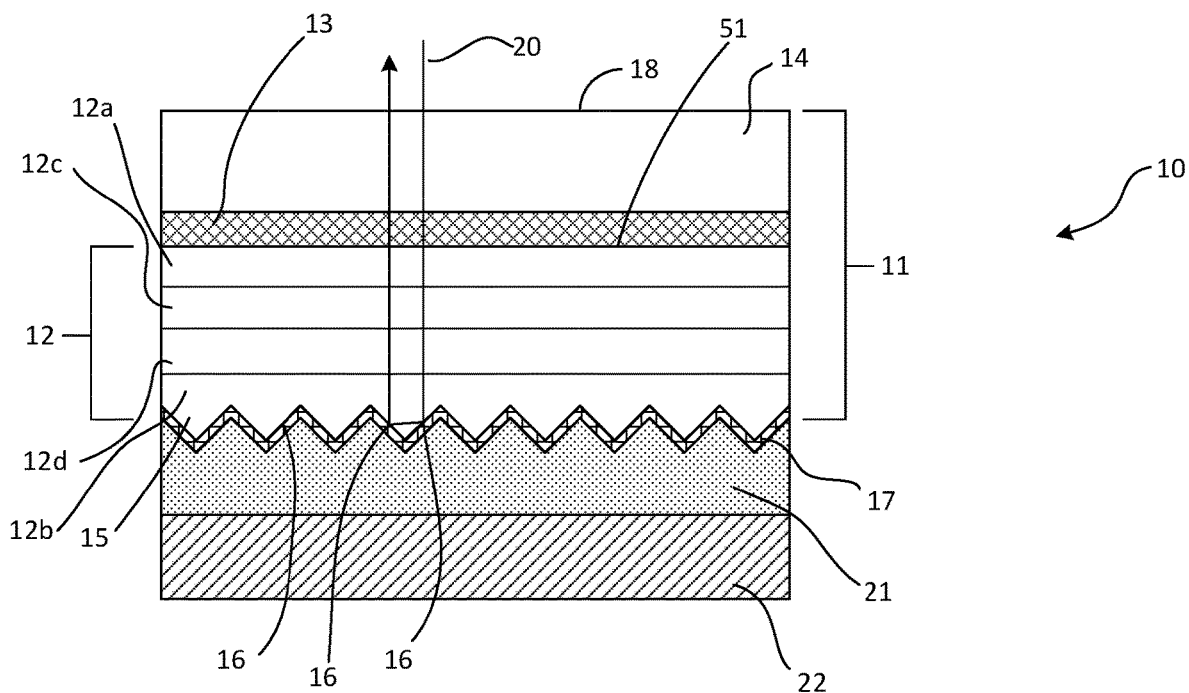
FIG. 6 shows a cross-sectional view of one embodiment of a black microprismatic retroreflective film with four body sub-layers.

FIG. 6 shows another embodiment of this disclosure where the body layer 12 of reflective face film 11 is split into four separate sub-layers. The microprisms 15 are formed into lower body sub-layer 12b, and the black color layer 13 is again adjacent to the upper surface 51 of upper body sub-layer 12a. However, in this example, body layer 12 also consists of middle upper body sub-layer 12c and middle lower sub-layer 12d. All four sub-layers (upper body sub-layer 12a, middle upper body sub-layer 12c, middle lower body sub-layer 12d, and lower body sub-layer 12b) combine to form body layer 12. Additionally, in this example, optional cap layer 14 is provided.

Suitable transparent polymer resins to be used in the body layer (including any sub-layer of the body layer) include acrylic polymers (including such acrylics as polymethyl methacrylate or polybutyl methacrylate) and acrylic copolymers; vinyl chloride polymers and vinyl chloride co-polymers; ethylene vinyl acetate; polycarbonate; polyester materials, such as polyethylene terephthalate (i.e., PET), and polyester copolymers, such as glycol-modified polyesters (e.g., PETG); polystyrene; polyurethane resins, including both aromatic and aliphatic urethanes; cellulosics, such as cellulose acetate; epoxies; fluoropolymers such as polychlorofluoroethylene, or polyvinylidene fluoride; polyamides; polyetherketones; polyetherimide; polyolefins such as polymethylpentene; polysulfone; silicone modified polymers (i.e., polymers that contain a small weight percent (less than 10 weight percent) of silicone) such as silicone polyamide and silicone polycarbonate; fluorine modified polymers such as perfluoropolyetheleneterephthalate; and mixtures of the above polymers such as a blend of polyester and polycarbonate or a blend of a fluoropolymer and acrylic many other highly transparent polymers. Particularly useful polymers of the body layer are acrylic polymers and polycarbonate polymers.

Additionally, as known in the art, the body layer (including any sub-layers) may also incorporate polymeric additives. Examples of such additives include UV-light absorbers, UV-light stabilizers, flame retardants, anti-oxidant additives, heat stabilizers, plasticizers, or any other polymeric additive. If the black microprismatic reflective film is intended to be used in outdoor environments for extended periods of time, UV-light absorbing additives (such as benzophenone or benzotriazole additives) and UV-light stabilizers (such as hindered amine light stabilizers) may prove particularly useful. Similarly, if high levels of flexibility and elasticity are desired, any of the plasticizers known in the art may be incorporated into the polymers of the body layer.

Optional cap layer 14 also consists of transparent polymeric resins and is commonly provided to enhance a certain performance property of the black retroreflective film. For example, cap layer 14 can be a highly durable polymeric film with UV-light screening properties to protect the lower layers of the product and enhance the overall weatherability of the film. Alternatively, cap layer 14 can provide graffiti resistance properties. Or, cap layer 14 can be added to simply protect the black color layer 13 from scratches, abrasion, and normal wear and tear. It is also possible for the cap layer to consist of multiple sub-layers of transparent polymers. The thickness of the cap layer 14 can range from about 25 microns to 400 microns. In certain embodiments, the cap layer 14 has a thickness between about 50 microns to 300 microns. Optional cap-layer 14 can be made from any of the same transparent polymeric resins as the body layer. Particularly useful polymeric resins are acrylic polymers (including such acrylics as polymethyl methacrylate or polybutyl methacrylate) and acrylic copolymers, fluoropolymers such as polychlorofluoroethylene, or polyvinylidene fluoride, or vinyl polymers such as polyvinyl chloride resin. Additionally, as with the body layer, any of the well-known polymeric additives can also be incorporated into the cap layer. For example, if the black microprismatic reflective film is desired to have high levels of flexibility and elasticity, it may be useful to incorporate plasticizer additives into a cap layer consisting of polyvinyl chloride resins. An another example, if the cap layer is to provide UV-light screening functions, any of the well-known UV-light absorbing additives, such as benzophenones or benzotriazoles, can be blended into the polymers of the cap layer.

Although cap layer 14 is described as optional, for many applications, the cap layer will prove to be essential. For example, for vehicle marking and vehicle graphics applications, the cap layer is critically important to protect the black color layer from abrasion as stones, gravel, or other road debris will frequently fly-up and impact the vehicle surface. Similarly, the cap layer can help to protect the black color layer from gasoline or fuel spills. Another benefit of providing the cap layer is that it allows the black color layer to be functionally integrated into the final product structure through many well-known microprismatic manufacturing processes. Functionally integrating the black color layer means that the black color layer is heat laminated, heat fused, and/or chemically cross-linked or otherwise chemically bonded directly to both the body layer and to the cap layer. As such, the overall construction of the black microprismatic retroreflective film is not dependent upon laminating adhesives, which may degrade overtime, to create a bond between any of the layers. For example, when embossing processes (such as the processes disclosed in U.S. Pat. No. 4,486,363 to Pricone, et al., or U.S. Pat. No. 6,375,776 to Buoni, et al.) are utilized to manufacture the reflective face film, notwithstanding the fact that the black color layer may have been previously printed onto either the body layer or cap layer, the heat and pressure provided during the embossing process thermally fuses the layers together into a single construction.

Figure 7:
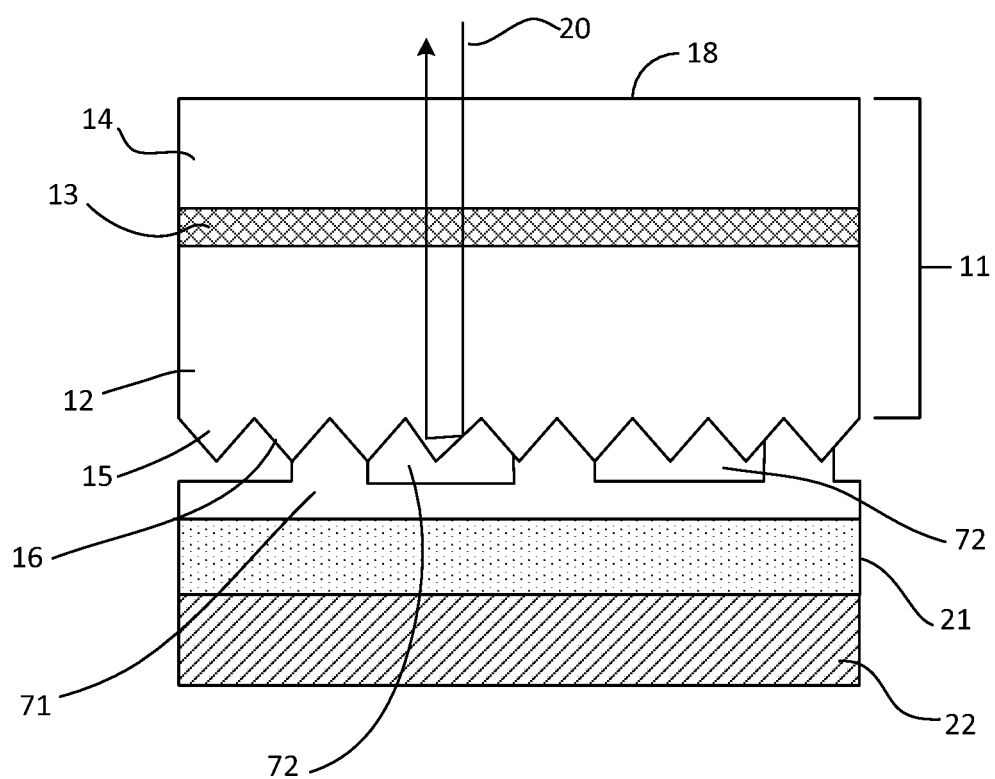
FIG. 7 shows a cross-sectional view of one embodiment of a black microprismatic retroreflective film with an air-celled construction.

As known in the art, there are generally three types of functioning microprismatic retroreflective film constructions. The first construction is an open-backed construction where the microprisms are exposed to air on the under-side of the product. In such configurations, reflective face film 11 is utilized in an unsupported fashion, and, as known in the art, the microprisms 15 will function through the principles of total internal reflection. One example of such an open-backed construction is shown in FIG. 5. However, this construction will have limited utility because if any dirt, water, or other substances that come into direct contact with the exposed microprisms, the levels of retroreflectivity will be greatly diminished. As such, as known in the art, reflective face film 11 can be utilized in either an air-celled construction or metalized film construction so that the microprisms can be protected to provide greater utility to black microprismatic retroreflective film. FIG. 7 depicts an air-celled construction. With this construction, as known in the art, a sealing film 71 is welded in a cellular pattern to the under-side of reflective face film 11 to encapsulate microprisms into an air cell 72. This allows the microprisms 15 to operate through the principals of total internal reflection while still being protected from dirt, water, or other substances. With this construction, it is preferred to utilize a black colored sealing film 71 to assist with creating a deep black daytime color.

The metalized film construction is shown in FIG. 1 and FIG. 6. Here, the microprisms 15 of reflective face film 11 can be coated with a specularly reflective coating 17, such as aluminum, nickel, or silver, and then operate through the principles of specular reflection. One benefit of the metalized construction is that the specularly reflective coating 17 on the microprisms naturally appears quite dark, even without the presence of the black color layer 13. Thus, the specularly reflective coating 17 can assist with darkening the daytime color. With either the air-celled construction or the metalized construction, the black retroreflective film can optionally be provided with an adhesive layer 21 and a removable release liner 22.

The black retroreflective film of this disclosure can be manufactured by any suitable microprismatic manufacturing process. Such useful manufacturing processes include the aforementioned embossing of preformed films into a molding tool (such as the processes disclosed in U.S. Pat. No. 4,486,363 to Pricone, et al. or U.S. Pat. No. 6,375,776 to Buoni, et al.), casting a fluid material into a molding tool (such as processes disclosed in U.S. Pat. No. 3,689,346 to Rowland), extrusion embossing (such as the process defined in U.S. Pat. No. 5,945,042 to Mimura, et al.), electrodeposition of polymeric powders into a molding tool (such as the process outlined in U.S. Pat. No. 8,226,880 B1 to Pricone), or other manufacturing techniques. Particularly useful are any processes which allow the black color layer to be functionally integrated into the overall construction of the reflective face film. Additionally, if the black color layer is to be printed or coated, it may be may be printed or coated onto either the body layer or cap layer in a prior manufacturing step.

The following examples demonstrate the disclosure in greater detail. In each example below, the black color layer was created using either a coating or printing methodology. In preparing the coating or ink, commercially available pigment dispersions were utilized to incorporate the pigment (or pigments) into solution instead of dispersing raw pigments. The benefit of using a commercially available pigment dispersion is that an additional formulating step can often be by-passed as such pigment dispersions readily go into solution using only high-speed mixing. However, with raw undispersed pigments, as known in the art, depending upon the specific grade of pigment and the polymeric resin selected, special dispersion equipment, such as milling stations or ball mills, may be required to properly disperse the pigment and reduce its particle size to desired levels. Further, specially formulated chemical additives, such as wetting agents or dispersing additives, may also be needed to disperse raw pigments.

Four different commercially available pigment dispersions were used throughout the examples below. Table 1 lists the details of each. Additionally, each of black pigment dispersions listed in Table 1 were dispersed into solvent and/or diluted with solvent for a particle size distribution analysis of the carbon black pigment. The BASF 0066-K and Hostaprint L34 carbon black pigment dispersions were each dispersed into Ethylene Glycol Monobutyl Ether Acetate solvent (commonly referred to as EB Acetate solvent) at approximately a 20% loading by weight and then further diluted with acetone solvent to prepare for particle size distribution analysis. The PAN Jet Black dispersion was further diluted with n-butyl acetate solvent in preparation for analysis. The results of the particle size distribution analysis are shown in Table 2.

TABLE 1

| Pigment Dispersion | Pigment | Pigment Weight % | Polymer Resin Weight % | Total Solids Weight % | Detailed Description |
|---|---|---|---|---|---|
| PAN Jet Black | Carbon Black (Pigment Black 7) | 18.0% | 28.8% | 46.8% | PanTINT ® 86 Series 86K1320 High Jet Black pigment dispersion, available from PAN Technology of Carlstadt, New Jersey. Contains carbon black pigment dispersed into a solvent-based thermoplastic acrylic resin solution of n-butyl acetate. |
| BASF 0066-K Black | Carbon Black (Pigment Black 7) | 50.0% | 50.0% | 100.0% | BASF Microlith Black 0066-K pigment dispersion available from BASF Corporation of Florham Park, New Jersey. Available as a solid powder where the carbon black pigment has been dispersed into a vinyl chloride/vinyl acetate copolymer. |
| BASF 7080-K Blue | Phthalo Blue (Pigment Blue 15:3) | 50.0% | 50.0% | 100.0% | BASF Microlith Blue 7080-K pigment dispersion available from BASF Corporation of Florham Park, New Jersey. Available as a solid powder where the phthalocyanine blue pigment has been dispersed into a vinyl chloride/vinyl acetate copolymer. |
| Hostaprint L34 | Carbon Black (Pigment Black 7) | 50.0% | 50.0% | 100.0% | Clariant Hostaprint L34 VP5300 pigment dispersion available from Clariant International Ltd. of Muttenz, Switzerland. Available as a solid powder where the carbon black pigment has been dispersed into a vinyl chloride/vinyl acetate copolymer. |

TABLE 2

| Pigment Dispersion | Maximum Particle Size (microns) | Median Particle Size (microns) |
|---|---|---|
| PAN Jet Black | 0.32 microns | 0.056 microns |
| BASF 0066-K Black | 0.25 microns | 0.084 microns |
| Hostaprint L34 | 0.50 microns | 0.094 microns |

It should be noted that a graph of the particle size distribution analysis for the BASF 0066-K Black dispersion is shown in FIG. 4.

Examples 1-4 were all prepared in a laboratory environment. In each of these examples, two or more thermoplastic polymeric films were embossed together using a heated platen press to simultaneously mold the microprisms and laminate the thermoplastic polymeric films together and to functionally integrate the black color layer into the film construction. However, prior to this embossing step, a solvent-based coating was applied to one of the thermoplastic films to initially create the black color layer. Using well-known laboratory techniques, the coating was drawn-down onto the thermoplastic film using a stainless steel bird bar. The sample was air dried for approximately 5 minutes and then placed into an oven at 55 degrees Celsius for an additional 5 minutes to remove the solvents and dry the coating. The thickness of the black color layer in each example was measured after the coating was dried using a Mitutoyo digital micrometer and taking the average of several measurements.

The laboratory embossing process of Examples 1-4 was accomplished by stacking all of the thermoplastic films (including the film with the black color layer) onto a previously prepared nickel molding tool containing microprism molding cavities. In each example, the microprisms were forward-tilted microprisms have a height of approximately 67 microns and a tilt angle of approximately 6.2 degrees. All of the microprisms were aligned in the same direction throughout the molding tool, and tiling was not utilized. On top of the stack of thermoplastic polymeric films, a thin gauge polyester carrier film was positioned having high-gloss surfaces on both sides of the film. Additionally, a silicone rubber pad was placed on top of the polyester carrier film. This entire stack was then placed into a Carver Auto-Series platen press having both heated upper and lower platens, which were preheated to the designated temperature in each specific example. After a short pre-heating dwell time, the platens were closed to apply the designated level of pressure and temperature for a predetermined amount of time. All of the samples in Examples 1-4 were approximately 4 inches by 4 inches in size. The nickel tool and stack were then removed from the platen press and rapidly cooled with compressed air. The polyester carrier film and silicone rubber pad were discarded, and the resulting black microprismatic reflective face film (which as referenced above can also be utilized as an open-backed microprismatic retroreflective film) was removed from the nickel tool.

For each sample, the daytime color was measured using a HunterLab Colorflex, and the coefficient of retroreflection was measured using a Zehtner 6060 Retroreflectometer at a −4 entrance angle and 0.2 observation angle. For both daytime color and retroreflectivity, several measurements were taken at multiple rotations and the average was reported.

Example 1 illustrates several different black microprismatic retroreflective films where both the body layer and the cap layer are constructed of thermoplastic acrylic films. In each instance, the body layer comprised two separate acrylic films, where the first film was the lower body sub-layer and the second film was the upper body sub-layer. Both the lower body sub-layer and upper body sub-layer were 63.5 micron films made from ALTUGLAS® DR-101 impact-modified polymethyl methacrylate acrylic available from Arkema, Inc. of Philadelphia, Pa. Thus, the overall body layer thickness was 127 microns. The cap layer was a 50 micron film made from OPTIX® CA-1000-E impact-modified polymethyl methacrylate acrylic available from Plaskolite Company of Columbus, Ohio. The coating to form the black color layer was applied to the underside of the cap layer. Thus, in the resulting retroreflective film structure, the black color layer was positioned between the cap layer and the upper body sub-layer. Table 3 provides the details of the coating formulation and resulting black color layer for each sample of Example 1.

TABLE 3

| Sample I.D. | Coating Formulation for Black Color Layer (weight %) | Approximate Weight % of Pigment in Black Color Layer After Drying | Average Thickness of Resulting Black Color Layer (microns) |
|---|---|---|---|
| 1A | 2.5% PAN Jet Black 19.5% Vinnol ® E 15/48A Vinyl Copolymer Resin[1] 78.0% Methyl Isobutyl Ketone Solvent (MIBK) | 2.15% | 2.8 microns |
| 1B | 2.5% PAN Jet Black 19.5% Vinnol ® E 15/48A Vinyl Copolymer Resin[1] 78.0% Methyl Isobutyl Ketone Solvent (MIBK) | 2.15% | 3.6 microns |
| 1C | 2.5% PAN Jet Black 19.5% Vinnol ® E 15/48A Vinyl Copolymer Resin[1] 78.0% Methyl Isobutyl Ketone Solvent (MIBK) | 2.15% | 9.1 microns |
| 1D | 0.27% BASF 0066-K Black 21.37% Degalan ® M825 Acrylic Resin[2] 77.27% n-Butyl Acetate Solvent 1.09% EB Acetate Solvent | 0.63% | 5.3 microns |
| 1E | 0.11% BASF 0066-K Black 23.19% Degalan ® M825 Acrylic Resin[2] 76.27% n-Butyl Acetate Solvent 0.43% EB Acetate Solvent | 0.23% | 9.1 microns |
| 1F | 0.5% Hostaprint L34 19.5% Vinnol ® E 15/48A Vinyl Copolymer Resin[1] 78.0% Methyl Isobutyl Ketone Solvent (MIBK) 2.0% EB Acetate Solvent | 1.25% | 7.6 microns |
| 1G | 0.5% BASF 0066-K Black 19.5% Vinnol ® E 15/48A Vinyl Copolymer Resin[1] 78.0% Methyl Isobutyl Ketone Solvent (MIBK) 2.0% EB Acetate Solvent | 1.25% | 5.3 microns |

[1] Vinnol ® E 15/48A is a polyvinyl chloride/vinyl acetate copolymer resin available from Wacker Chemical Corporation of Adrian, Michigan.
[2] Degalan ® M825 is a thermoplastic acrylic resin available from Evonik Industries AG of Darmstadt, Germany.

For the lab embossing, both the upper and lower platen temperatures were set to 310 degrees Fahrenheit with a pre-heating dwell time of 90 seconds. Following the preheat, a pressure of 20,000 lbs. was applied for 45 seconds. After the sample was embossed, the microprisms of each sample were vacuum-metalized with an aluminum coating of greater than 99.9% purity. The daytime color and retroreflectivity of each sample is reported in Table 4. FIG. 8 plots the daytime chromaticity coordinates for each sample.

TABLE 4

| Sample I.D. | Coefficient of Retroreflection (cd/lx/m²) | Daytime color measurements | | |
|---|---|---|---|---|
| | | x | y | Y % |
| 1A | 195.1 | 0.3056 | 0.3235 | 2.17 |
| 1B | 100.5 | 0.3038 | 0.3206 | 1.44 |
| 1C | 69.9 | 0.2997 | 0.3180 | 1.22 |
| 1D | 251.9 | 0.2972 | 0.3146 | 3.11 |
| 1E | 123.3 | 0.3056 | 0.3224 | 2.43 |
| 1F | 203.6 | 0.3020 | 0.3190 | 2.46 |
| 1G | 97.8 | 0.3038 | 0.3199 | 1.67 |

The samples of Example 1 demonstrate several important aspects of this disclosure. First, from a materials perspective, the example demonstrates how both acrylic and vinyl copolymer resins can be utilized in the black color layer. In fact, Samples 1A, 1B, 1C, 1D, and 1E demonstrate how both acrylic and vinyl copolymer resins can be mixed together in the black color layer.

Next, the samples demonstrate the effect of thickness and pigment loading levels in the black color layer on retroreflectivity and daytime color. Samples 1A, 1B, and 1C all incorporate the same black color layer formula and the same pigment loading levels of 2.15%. Only the thickness of the black color layer was different. As would be expected, the thinnest black color layer of Sample 1A resulted in a sample with the highest levels of reflectivity and the lightest black daytime color appearance as evidenced by the higher daytime luminance factor Y %. On the other hand, the thickest black color layer of Sample 1C resulted in the darkest black daytime color appearance (as evidenced by the lower Y % value) and lower levels of retroreflection.

Example 2 demonstrates a black microprismatic retroreflective film incorporating both polycarbonate polymers and acrylic polymers into the body layer. As with Example 1, the cap layer is a 50 micron film of acrylic polymer. The body layer combined a 175 micron thick lower body sub-layer polycarbonate film and a 50 micron upper body sub-layer acrylic film. Thus, the overall thickness of the body layer was 225 microns. The polycarbonate film was LEXAN® 8A35 available from SABIC Innovative Plastics of Pittsfield, Mass. Both the upper body sub-layer film and the cap layer film were made from OPTIX® CA-1000-E impact-modified polymethyl methacrylate acrylic. The coating to form the black color layer was applied to the underside of the cap layer. Thus, as with Example 1, the black color layer was positioned between the cap layer and the upper body sub-layer in the resulting retroreflective film structure. Table 5 provides the details of the coating formulation and resulting black color layer for each sample of Example 2.

TABLE 5

| Sample I.D. | Coating Formulation for Black Color Layer (weight %) | Approximate Weight % of Pigment in Black Color Layer After Drying | Average Thickness of Resulting Black Color Layer (microns) |
|---|---|---|---|
| 2A | 2.5% PAN Jet Black 19.5% Vinnol ® E 15/48A Vinyl Copolymer Resin¹ 78.0% Methyl Isobutyl Ketone Solvent (MIBK) | 2.15% | 2.5 microns |
| 2B | 0.5% Hostaprint L34 19.5% Vinnol ® E 15/48A Vinyl Copolymer Resin 78.0% Methyl Isobutyl Ketone Solvent (MIBK) 2.0% EB Acetate Solvent | 1.25% | 4.7 microns |
| 2C | 0.5% BASF 0066-K Black 19.5% Vinnol ® E 15/48A Vinyl Copolymer Resin¹ 78.0% Methyl Isobutyl Ketone Solvent (MIBK) 2.0% EB Acetate Solvent | 1.25% | 5.1 microns |

To emboss the samples of Example 2, the upper and lower platens on the Carver Press were set to 345 degree Fahrenheit. The pre-heating dwell time was 90 seconds, and a pressure of 20,000 lbs. was applied for 65 seconds. As with Example 1, after each sample was embossed, the microprisms were vacuum-metalized with an aluminum coating of greater than 99.9% purity. Daytime color and retroreflectivity measurements are shown in Table 6. The daytime color chromaticity coordinates of each sample are also plotted in FIG. 9.

TABLE 6

| Sample I.D. | Coefficient of Retroreflection (cd/lx/m²) | Daytime color measurements | | |
|---|---|---|---|---|
| | | x | y | Y % |
| 2A | 133.3 | 0.3141 | 0.3313 | 1.86 |
| 2B | 140.1 | 0.3086 | 0.3264 | 2.45 |
| 2C | 195.8 | 0.3070 | 0.3246 | 3.28 |

Example 3 demonstrates a black microprismatic retroreflective film utilizing a flexible polyvinyl chloride polymeric film as the cap layer. The cap layer was a clear 300 micron film believed to contain a blend of polymeric and monomeric plasticizers available from Renolit Group of Worms, Germany under the part number designation FGA-GG-K. The body layer was a 50 micron acrylic film of OPTIX® CA-1000-E impact-modified polymethyl methacrylate acrylic. Prior to embossing, the black color layer was applied as a thin coating to the underside of the cap layer. The black color layer coating formula was identical to that of Samples 1A, 1B, and 1C. Thus, the resulting carbon black pigment concentration was 2.15%. The thickness of the black color layer after drying was 5.3 microns. For embossing the sample, the upper and lower platen temperatures were set to 320 degrees Fahrenheit. The pre-heating dwell time was 90 seconds, and a pressure of 2,500 lbs. was applied for 90 seconds. As with prior examples, the sample of Example 3 was metalized through a vacuum coating process with aluminum of greater than 99.9% purity. Table 7 shows the resulting coefficient of retroreflection and daytime color measurements.

TABLE 7

| Coefficient of Retroreflection | Daytime color measurements | | |
|---|---|---|---|
| (cd/lx/m²) | x | y | Y % |
| 94.1 | 0.3195 | 0.3381 | 2.15 |

Example 4 demonstrates the effect of incorporating small quantities of blue pigment into the black color layer of the acrylic constructions of Example 1. Samples 4A and 4B were prepared in an identical fashion to the samples of Example 1 except that the black color layer was formed using the coatings listed in Table 8.

TABLE 8

| Sample I.D. | Coating Formulation for Black Color Layer (weight %) | Approximate Weight % of Pigment in Black Color Layer After Drying | % of Blue Pigment relative to Black Pigment | Average Thickness of Resulting Black Color Layer (microns) |
|---|---|---|---|---|
| 4A | 0.504% BASF 0066-K Black 0.016% BASF 7080-K Blue 19.480% Vinnol ® E 15/48A Vinyl Copolymer Resin 77.923% Methyl Isobutyl Ketone Solvent (MIBK) 2.077% EB Acetate Solvent | 1.30% | 3.1% | 5.8 microns |
| 4B | 0.499% BASF 0066-K Black 0.035% BASF 7080-K Blue 19.467% Vinnol ® E 15/48A Vinyl Copolymer Resin 77.865% Methyl Isobutyl Ketone Solvent (MIBK) 2.134% EB Acetate Solvent | 1.33% | 7.0% | 7.9 microns |

After embossing, the samples were vacuum-metalized in an identical fashion to the constructions of Example 1. Measurements for daytime color and the coefficient of retroreflection are listed in Table 9. The daytime color chromaticity measurements are also plotted in FIG. 10. For reference purposes, the chromaticity of Sample 1G is also plotted in FIG. 10. As can be expected, the presence of the blue pigment shifts the color towards the blue color space.

TABLE 9

| Sample I.D. | Coefficient of Retroreflection (cd/lx/m²) | Daytime color measurements | | |
|---|---|---|---|---|
| | | x | y | Y % |
| 4A | 211.9 | 0.2968 | 0.3160 | 2.77 |
| 4B | 230.75 | 0.2937 | 0.3153 | 3.13 |

Example 5 outlines a material produced in a production environment using a rotary gravure printing process to apply the black color layer. Additionally, Example 5 demonstrates a construction with multiple sub-layers comprising the overall body layer.

Three separate transparent polymeric film layers were provided as listed below:

Film 5-A: 50 micron extruded film made from impact-modified polymethyl methacrylate acrylic resin. The acrylic resin was CA-1000E2 (commercially available from Plaskolite West of Compton, Calif.). The microprisms were eventually formed into this film, and it became part of the body layer as the lower body sub-layer.

Film 5-B: 150 micron co-extruded film consisting of three distinct layers. The upper and lower layers were made from ACRYPET® MF polymethyl methacrylate resin (commercially available from Mitsubishi Rayon). The middle layer was made from polycarbonate resin. This film became part of the overall body layer and contained the upper body sub-layer, the middle upper body sub-layer, and the middle lower body sub-layer in the final retroreflective film construction. The polycarbonate middle layer of this film became the middle upper body sub-layer of the body layer.

Film 5-C: 75 micron acrylic film incorporating high levels of UV-light screening properties. This film is available as AURA® 9127 film (commercially available from Aura Optical Systems, L.P.). This film ultimately became the cap layer in the final product construction.

A black printing ink was prepared following the formula listed in Table 10. The ink was then rotary gravure printed onto the upper surface of Film 5-B and dried through an oven to remove the solvents. This printed layer ultimately became the black color layer in the final product construction.

TABLE 10

| Component | Weight % |
|---|---|
| Polyvinyl chloride/polyvinyl acetate co-polymer resin UCAR VYHH (available from Dow Chemical Company) | 21.1% |
| Pigment dispersion of carbon black pigment (Pigment Black 7) in polyvinyl chloride copolymer resin. MICROLITH ® Black 0066-K (available from BASF Corporation) | 4.2% |
| Pigment dispersion of phthalocyanine blue pigment (Pigment Blue 15:3) in polyvinyl chloride copolymer resin. MICROLITH ® Blue 7080-K (available from BASF Corporation) | 0.3% |
| Methyl Isobutyl Ketone Solvent | 54.7% |
| Isopropyl Acetate Solvent | 18.2% |
| Mixture of UV-light stabilizing and heat stabilizing additives | 1.5% |

A rotatory embossing tool was provided with microprism molding cavities to allow the formation of forward-tilted microprisms with a height of approximately 67 microns and having a tilt angle of approximately 6.2 degrees. The microprisms were tiled into discrete arrays of microprisms. Approximately 50% of the tiled microprisms were aligned at a rotation of 45 degrees to the edge of the reflective film. The shapes of the tiles were parallelograms. Not all of the individual tiles were identical in size, and each individual tile had an area between 250 to 400 square millimeters.

Following the known manufacturing methods as outlined in U.S. Pat. No. 4,486,363 to Pricone, et al., the reflective face film 11 was prepared. Using heat and pressure with temperatures above 200 degrees C., Film 5-A was embossed into the rotatory embossing tool to form the microprisms. Then, while Film 5-A was still engaged with the rotary embossing tool, the black printed Film 5-B and Film 5-C were heat laminated to Film 5-A. The black printed ink on the surface of Film 5-B was positioned towards the underside of Film 5-C. At this point, Film 5-A and Film 5-B combined to form body layer 12, which consisted of multiple polymeric sub-layers. Additionally, a temporary polyester carrier film was laminated to the outside surface of the films to ultimately assist in removal of the reflective face film from the embossing tool and to impart a gloss surface to the film. After cooling to below 25 degrees C., the film was removed from the rotary embossing tool. By manufacturing this reflective face film through this thermal embossing process, the black color layer was functionally integrated into the construction by being thermally bonded directly to both the cap layer and the body layer.

A specularly reflective coating 17 was then applied to the faces 16 of the microprisms 15 of the body layer 12 through a vacuum deposition process using aluminum of greater than 99.9% purity. Then, during a subsequent manufacturing step, an acrylic-based pressure sensitive adhesive and release liner were laminated to the under-side of the film construction. The temporary polyester carrier was removed, thus creating the black retroreflective film 10 of FIG. 6.

Using a Zehtner 6060 Retroreflectometer, the coefficient of retroreflection was measured at a −4 entrance angle and 0.2 observation angle. Approximately 15 measurements were taken. The average of the measurements was 109.9 cd/lx/m2.

The daytime color of the film was measured using a HunterLab ColorFlex 0/45 colorimeter using Standard Illuminant D65 at a 2 degree observer. The chromaticity coordinates and daytime luminance factor (CIE 1931 Standard Colorimetric System) are listed in Table 11 and correspond to a deep black daytime color.

Additionally, a flashlight was used to assess visual appearance of the nighttime retroreflected color. It was found to have a crisp blue-white appearance.

TABLE 11

| x | y | Y % |
|---|---|---|
| 0.301 | 0.328 | 1.48 |

For comparison purposes, Example 7 provides the daytime color and coefficient of retroreflection for three known products available on the market. This information is shown in Table 12. Each of these three products incorporate glass-bead microspheres as the retroreflective optical elements. Although the daytime color falls within the black chromaticity color box shown in FIGS. 8-10, as can be seen in Table 12, the coefficient of retroreflection is far below the levels provided by the black microprismatic retroreflective film of this disclosure. Additionally, when viewed retroreflectively with a flash-light, the nighttime color of each material either appears brown or has a yellow tint to the retroreflected color.

TABLE 12

| Sample I.D. | Coefficient of Retroreflection (cd/lx/m$^2$) | Daytime color measurements | | |
|---|---|---|---|---|
| | | x | y | Y % |
| 7A: NIKKALITE ® 48003 Series Black [1] | 2.8 | 0.3223 | 0.3370 | 0.66 |
| 7B: AVERY ® HV-1200 Series Black [2] | 7.1 | 0.3214 | 0.3345 | 1.40 |
| 7C: ORALITE ® 5650-RA Series Black [3] | 39.8 | 0.3022 | 0.3178 | 1.26 |

[1] NIKKALITE ® 48003 is available from Nippon Carbide Industries (USA), Inc. of Santa Fe Springs, California.
[2] AVERY ® HV-1200 is available from Avery Dennison Corporation of Pasadena, California.
[3] ORALITE ® 5650-RA is available from ORAFOL America of Black Creek, Georgia.

In Example 8, nighttime color measurements were taken for several of the examples of this disclosure following the methods outlined in ASTM Practice E811 using standard illuminant A with an observation angle of 0.33 degrees and an entrance angle of 5 degrees to define x, y color chromaticity coordinates. For each sample, the measurements at 0 degree and 90 degree rotations were averaged. Additionally, the nighttime color for all of the samples of Example 7 were also taken. All of these measurements are shown in Table 13 and are plotted in FIG. 11.

When viewed retroreflectivity with a flash light, all of the samples of this disclosure retroreflect a white or blue-white nighttime color. The samples of Examples 4A, 4B, and 5 have an especially vibrant blue-white appearance, as would be anticipated by the addition of the blue pigment to the black color layer. On the other hand, as previously mentioned, all of the prior art examples have either a yellow-tint or a brown nighttime color. Example 7B has a particularly brown nighttime color, and this is indicated in the data below by the very high x chromaticity value.

TABLE 13

| Sample I.D. | Nighttime Color Chromaticity | |
|---|---|---|
| | x | y |
| Example 1B | 0.4786 | 0.4190 |
| Example 1D | 0.4541 | 0.4141 |
| Example 1G | 0.4748 | 0.4167 |
| Example 2B | 0.4669 | 0.4165 |
| Example 3C | 0.4765 | 0.4163 |
| Example 4A | 0.4515 | 0.4161 |
| Example 4B | 0.4430 | 0.4168 |
| Example 5 | 0.4520 | 0.4193 |
| Example 7A, NIKKALITE ® 48003 Series Black | 0.5007 | 0.4167 |
| Example 7B, AVERY ® HV-1200 Series Black | 0.5262 | 0.4180 |
| Example 7C, ORALITE ® 5650-RA Series Black | 0.4859 | 0.4240 |

Those skilled in the art to which this application relates will appreciate that other and further additions, deletions, substitutions and modifications may be made to the described embodiments.

What is claimed is:

1. A black microprismatic retroreflective film, said black microprismatic film comprises:
    a body layer containing microprismatic optical elements located on an underside of said body layer; and
    a black color layer which gives said black microprismatic retroreflective film a daytime color of black;
    wherein:
        light impinging on a face of said black microprismatic retroreflective film passes through said black color layer before being reflected by said microprismatic optical elements of said body layer; and
        said black microprismatic retroreflective film has a coefficient of retroreflectivity greater than about 50 cd/lx/m2 at a −4 degree entrance angle and 0.2 degree observation angle.

2. The film as recited in claim 1, wherein said black microprismatic film has a coefficient of retroreflectivity greater than about 70 cd/lx/m2 at a −4 degree entrance angle and 0.2 degree observation angle.

3. The film as recited in claim 1, wherein a thickness of said black color layer is less than about 50 microns.

4. The film as recited in claim 1, wherein said black color layer includes black pigment.

5. The film as recited in claim 4, wherein a maximum particle size of said black pigment is less than about 1 micron.

6. The film as recited in claim 4, wherein a median particle size of said black pigment is less than about 0.3 microns.

7. The film as recited in claim 4, wherein a loading of said black pigment in said black color layer is between about 0.05% and about 5.0% weight percentage.

8. The film as recited in claim 4, wherein said black color layer also includes blue pigment.

9. The film as recited in claim 1, further comprising a cap layer.

10. The film as recited in claim 1, wherein said microprismatic optical elements are tiled in two or more arrays.

11. The film as recited in claim 1, wherein said microprismatic optical elements are metalized with a specularly reflective coating.

12. The film as recited in claim 1, wherein said film has a daytime luminance factor of less than about 3.5.

13. The film as recited in claim 1, wherein said film has a daytime luminance factor of less than about 2.0.

14. The film as recited in claim 1, wherein said film has daytime color chromaticity falling within a chromaticity color box defined by four sets of x, y coordinates, wherein said x, y coordinates are:
$X_1=0.288$, $y_1=0.297$;
$X_2=0.334$, $y_2=0.327$;
$X_3=0.320$, $y_3=0.353$; and
$X_4=0.275$, $y_4=0.322$.

15. The film as recited in claim 1, wherein said black color layer allows for light to be reflected in nighttime as white or blue-white light.

16. The film as recited in claim 15, wherein said film has nighttime color chromaticity falling within a chromaticity color box defined by four sets of x, y coordinates, wherein said x, y coordinates are:
$X_1=0.425$, $y_1=0.418$;
$X_2=0.475$, $y_2=0.428$;
$X_3=0.491$, $y_3=0.418$; and
$X_4=0.440$, $y_4=0.407$.

17. The film as recited in claim 1, wherein said body layer includes two or more body sub-layers.

18. A traffic sign, comprising:
a panel; and
a black microprismatic retroreflective film affixed to said panel, said black microprismatic retroreflective film including:
  a body layer containing microprismatic optical elements located on an underside of said body layer; and
  a black color layer which gives said black microprismatic retroreflective film a daytime color of black;
wherein:
  light impinging on a face of said black microprismatic retroreflective film passes through said black color layer before being reflected by said microprismatic optical elements of said body layer; and
  said black microprismatic retroreflective film has a coefficient of retroreflectivity greater than about 50 cd/lx/m2 at a −4 degree entrance angle and 0.2 degree observation angle.

19. The traffic sign as recited in claim 18, wherein a thickness of said black color layer is less than about 50 microns.

20. The traffic sign as recited in claim 18, wherein said film has a daytime luminance factor of less than about 3.5.

21. A vehicle, comprising:
body panels; and
a black microprismatic retroreflective film affixed to at least one of said body panels, said black microprismatic retroreflective film including:
  a body layer containing microprismatic optical elements located on an underside of said body layer; and
  a black color layer which gives said black microprismatic retroreflective film a daytime color of black;
wherein:
  light impinging on a face of said black microprismatic retroreflective film passes through said black color layer before being reflected by said microprismatic optical elements of said body layer; and
  said black microprismatic retroreflective film has a coefficient of retroreflectivity greater than about 50 cd/lx/m2 at a −4 degree entrance angle and 0.2 degree observation angle.

22. The vehicle as recited in claim 21, wherein a thickness of said black color layer is less than about 50 microns.

23. The vehicle as recited in claim 21, wherein said film has a daytime luminance factor of less than about 3.5.

24. A vehicle number plate, comprising:
a mounting plate; and
a black microprismatic retroreflective film affixed to said mounting plate, said black microprismatic retroreflective film including:
  a body layer containing microprismatic optical elements located on an underside of said body layer; and
  a black color layer which gives said black microprismatic retroreflective film a daytime color of black;
wherein:
  light impinging on a face of said black microprismatic retroreflective film passes through said black color layer before being reflected by said microprismatic optical elements of said body layer; and
  said black microprismatic retroreflective film has a coefficient of retroreflectivity greater than about 50 cd/lx/m2 at a −4 degree entrance angle and 0.2 degree observation angle.

25. The vehicle number plate as recited in claim 24, wherein a thickness of said black color layer is less than about 50 microns.

26. The vehicle number plate as recited in claim 24, wherein said film has a daytime luminance factor of less than about 3.5.

* * * * *